(12) United States Patent
Ren et al.

(10) Patent No.: US 9,580,815 B2
(45) Date of Patent: Feb. 28, 2017

(54) METHOD AND APPARATUS FOR NANOCRYSTALLIZING A METAL SURFACE BY SHOCK WAVE-ACCELERATED NANOPARTICLES

(75) Inventors: Xudong Ren, Jiangsu (CN); Shouqi Yuan, Zhenjiang (CN); Yinghong Li, Xi'an (CN); Liang Ruan, Jiangsu (CN); Yongkang Zhang, Jiangsu (CN); Naifei Ren, Zhenjiang (CN); Yongzhuo Huangfu, Jiangsu (CN); Cheng Wang, Xi'an (CN); Weifang He, Xi'an (CN); Fengze Dai, Jiangsu (CN); Tian Zhang, Jiangsu (CN)

(73) Assignee: JIANGSU UNIVERSITY (CN)

( * ) Notice: Subject to any disclaimer, the term of this patent is extended or adjusted under 35 U.S.C. 154(b) by 396 days.

(21) Appl. No.: 14/239,270

(22) PCT Filed: Jul. 28, 2011

(86) PCT No.: PCT/CN2011/077728
§ 371 (c)(1),
(2), (4) Date: Feb. 18, 2014

(87) PCT Pub. No.: WO2012/151788
PCT Pub. Date: Nov. 15, 2012

(65) Prior Publication Data
US 2014/0178593 A1   Jun. 26, 2014

(30) Foreign Application Priority Data

May 11, 2011 (CN) .......................... 2011 1 0120824

(51) Int. Cl.
*C23C 24/04* (2006.01)
*B23K 26/00* (2014.01)
(Continued)

(52) U.S. Cl.
CPC .......... *C23C 24/04* (2013.01); *B23K 26/0069* (2013.01); *C23C 4/04* (2013.01); *C23C 4/10* (2013.01); *C23C 24/085* (2013.01)

(58) Field of Classification Search
CPC  B21D 26/06; B23K 26/1417; B23K 26/1411; B24C 1/10; B05B 7/0006; C23C 24/085
(Continued)

(56) References Cited

U.S. PATENT DOCUMENTS

| 2006/0006158 A1 | 1/2006 | Lawrence et al. |
| 2009/0158797 A1* | 6/2009 | Lahrman ............ B23K 26/0069 72/53 |

FOREIGN PATENT DOCUMENTS

| CN | 1924030 A | 3/2007 |
| CN | 101701282 A | 5/2010 |

(Continued)

OTHER PUBLICATIONS

Barometric pressure. (2014). In "Barometric Pressure". 2014. In Collins English Dictionary, Collins Dictionaries. London: Collins. http://search.credoreference.com/content/entry/hcengdict/barometric_pressure/0.*

(Continued)

*Primary Examiner* — Dah-Wei D Yuan
*Assistant Examiner* — Jose Hernandez-Diaz
(74) *Attorney, Agent, or Firm* — Schmeiser, Olsen & Watts, LLP

(57) ABSTRACT

A method and apparatus for nanocrystallizing a metal surface by laser-induced shock wave-accelerated nanoparticles. The apparatus comprises a control system, a light guiding system, a workbench control system and an auxiliary system, wherein the auxiliary system comprises an air compressor, a paint feeder device, a nanoparticle nozzle, a powder feeder device, an exhaust, a sealed working chamber (Continued)

and a metal nanoparticle recycler device. The method comprises the following steps: pre-processing and fixing a workpiece; activating the air compressor to feed a powder; controlling and adjusting the paint feeder device to eject a black paint; transmitting a high-power pulse laser beam; recycling excess metal nanoparticles; and rinsing non-vaporized/ionized black paint off a surface of the workpiece.

7 Claims, 2 Drawing Sheets

(51) Int. Cl.
 *C23C 24/08* (2006.01)
 *C23C 4/10* (2016.01)
 *C23C 4/04* (2006.01)
(58) Field of Classification Search
 USPC ........ 118/620, 300, 323, 326; 427/446, 450, 427/596; 72/53, 54, 56
 See application file for complete search history.

(56) References Cited

FOREIGN PATENT DOCUMENTS

| | | | |
|---|---|---|---|
| CN | 101736214 A | | 6/2010 |
| CN | 101787528 A | * | 7/2010 |
| JP | 2006320907 A | | 11/2006 |

OTHER PUBLICATIONS

Machine Translation of CN101787528A.*
PCT/CN2011/077728 International File Date: Jul. 28, 2011—International Search Report; Jiangsu University; 2 pages.
PCT/CN2011/077728 International File Date: Jul. 28, 2011—Written Opinion; Jiangsu University; 5 pages.
PCT/CN2011/077728 International File Date: Jul. 28, 2011—International Preliminary Report on Patentability; Jiangsu University; 6 pages.

* cited by examiner

US 9,580,815 B2

METHOD AND APPARATUS FOR NANOCRYSTALLIZING A METAL SURFACE BY SHOCK WAVE-ACCELERATED NANOPARTICLES

FIELD OF TECHNOLOGY

The following relates to the field of nanocrystallizing a metal material surface, particularly to a method for nanocrystallizing a metal surface by laser-induced shock wave-accelerated nanoparticles.

BACKGROUND

Due to fine grain (usually less than 100 nm) and high interface density, metal nanocrystalline materials show unique mechanical performances and physicochemical performances, developing a new way for improving the comprehensive mechanical performances and service behaviors of conventional materials.

Most failure of materials occurs on the surface of the materials. For example, fatigue, corrosion and wear to materials are extremely sensitive to the surface structure and performances of the materials. Therefore, the surface structure and performances of materials have direct influence on its comprehensive performances. As a new method of surface modification, the metal surface nanocrystallization process utilizes the excellent performance of nano metal materials to prepare a superficial layer of nanocrystalline structure on a surface of traditional engineering metal materials, in order to improve the surface structure and performances of the metal materials, particularly, the fatigue resistance, corrosion resistance and friction and wear resistance, and to improve the comprehensive mechanical performances of the materials and therefore prolong the service life of the materials. Thus, nanocrystallization of metal material surfaces is of remarkable significance to the prolonging of the service life of the metal parts.

There are two major ways for nanocrystallization of a metal material surface. The first nanocrystallization way is surface coating or deposition, that is, heterogeneous materials are introduced in to form a nanostructured coating on a surface of the materials. The surface coating or deposition methods include Physical Vapor Deposition (PVB), Chemical Vapor Deposition (CVD), sputtering, electroplating, ejecting, etc. Due to the disadvantage of weak bonding between the coating and the substrate and between the coating particles, such way is likely to result in surface peeling or falling. Therefore, the application of such way in the industrialization is restricted. The second nanocrystallization way is mechanical surface grinding, that is, severe shaping transformation is mechanically caused on a metal surface, thus to refine the surface structure for the purpose of surface nanocrystallization. The mechanical surface grinding includes high-energy shot peening, ultrasonic shot peening, rolling, etc. There is no obvious interface between a nanostructured surface prepared according to this nanocrystallization way and a substrate structure, and no peeling or separation occurs; therefore, the performance in use of the materials is improved significantly. However, this nanocrystallization way has some limitations, for example, it is difficult to perform surface nanocrystallization on parts with curved surfaces, and disadvantages such as low productivity restrict the industrialization.

In an Invention Patent CN1924030A, entitled "Method for Nanocrystallizing Metal Surface by Using Ultrasonic High-energy Surface Machining", a punch on an ultrasonic transducer is allowed to directly contact with a surface to be processed of a metal part to transmit the ultrasonic vibration energy to the metal part, and severe local plastic deformation at a high strain rate is performed on the metal surface, so that the grains on the metal superficial layer are refined to nanometer. The biggest advantage of that invention is that a layer of nanocrystalline with the same chemical components as the metal part substrate may be formed on the metal surface and the surface finish of the metal part may be significantly improved, without using any pellets or particles as intermediate energy carriers. The disadvantages of that invention is that, due to the limitations of the shape and size of the punch, the processed metal material surface is uneven with lumps and bumps and has high roughness, which may influence its surface property to some extent.

SUMMARY

Considering the disadvantages of the above technologies, embodiments of the present invention provides a method for nanocrystallizing a metal surface by laser-induced shock wave-accelerated metal nanoparticles. An air compressor produces a tremendous pressure to accelerate and direct metal nanoparticles into a sealed working chamber with an exhaust; and, black paint ejected from tapered holes generates a shock wave by the effect of laser radiation; the metal nanoparticles already with a certain speed are constantly accelerated by the laser-induced shock wave, so that the metal nanoparticles shock at the maximum speed and are embedded into the metal material surface to form a nanostructured layer, whereby the nanocrystallization of a metal material surface is realized.

A specific method for nanocrystallizing a metal surface by shock wave-accelerated metal nanoparticles is provided. A laser beam penetrates through high pressure resistant K9 glass and radiates onto the black paint ejected from tapered holes. The black paint absorbs the laser energy and explodes. The compressed air forms an intense shock wave that produces powerful thrust to move the metal nanoparticles already with a certain speed downwards at an initial speed that is several times of sound velocity. With the continuous propagation of the shock wave in air, when the metal nanoparticles move to a next position, the thrust produced by the shock wave accelerates the metal nanoparticles, and when the metal nanoparticles move to a further next position, the thrust produced by the shock wave accelerates the metal nanoparticles again. The thrust produced by the shock wave propagating in air constantly accelerates the metal nanoparticles, thus the metal nanoparticles move at an ever-increasingly faster speed and gain the maximum speed when reaching the metal material surface, where the metal nanoparticles shock at the maximum speed and are embedded into the metal material surface to form a nanostructured layer. Meanwhile, as the shock effect between the metal nanoparticles and the metal material surface results in server plastic deformation on the metal surface thus to form a large number of dislocation, twin-crystal and sub-crystal structures that lead to grain refinement, the metal material surface itself forms nanocrystalline, so that the surface structure property of the metal material and therefore the comprehensive mechanical performances of the metal material are improved and the service life of the material is prolonged.

Specific embodiments of the present invention will be described as below, and are not intend to limit the present invention. Embodiments of the present invention comprises a control system, a light guiding system, a workbench control system and an auxiliary system.

The control system comprises an industrial controller, a digital controller, a laser controller and a pressure controller, the digital controller being connected to the laser controller at the upper end and to the industrial controller at the lower end, the laser controller being connected to a high-power pulse laser device, the industrial controller controlling the laser controller, a spot regulator device and a five-axis linkage workbench via the digital controller, respectively, the laser controller controlling the high-power pulse laser device, the pressure controller controlling the pressure of air output from an air tank.

The light guiding system comprises a light guiding pipe, a pounding head and a spot regulator device, the spot regulator device being located between the high-power pulse laser device and the pounding head and connected to the digital controller, the high-power pulse laser device being located above the spot regulator device while the pounding head being located below the spot regulator device, a focusing lens being located inside the pounding head, the light guiding pipe and the high-power pulse laser device being connected in series, the spot regulator device and the pounding head being connected in series.

The workbench control system comprises a digital controller, a workpiece and a five-axis linkage workbench, the workpiece being placed above the five-axis linkage workbench, the digital controller regulating the relative position of the workpiece and a nanoparticle nozzle by controlling the five-axis linkage workbench.

The auxiliary system comprises an air compressor, a paint feeder device, a nanoparticle nozzle, powder feeder device, an exhaust, a sealed working chamber and a metal nanoparticle recycler device, the nanoparticle nozzle being located in the upper part of the sealed working chamber, the nanoparticle nozzle being a hollow cylinder with a ring-shaped inner chamber and a ring-shaped outer chamber, a spacer A being located on a flange of an outer wall of the inner chamber, a piece of high pressure resistant K9 glass being located between the spacer A and a spacer B and fixed by a top cover, two tapered holes symmetrically distributed along an axis being disposed on the bottom of the inner chamber, a black paint input port in the upper left part of the inner chamber being connected to the paint feeder device, a nanoparticle input port A and a nanoparticle input port B located in the upper part of the outer chamber and symmetrically distributed along an axis being connected to the powder feeder device via an air guiding pipe, respectively, the powder feeder device being connected to the pressure controller via the air guiding pipe, the pressure controller being connected to the air tank via the air guiding pipe, the exhaust and the metal nanoparticle recycler device being respectively connected to the sealed working chamber, the exhaust being located at the left side of the sealed working chamber with the exhaust pipe of the exhaust located in the lower part of the five-axis linkage workbench, the metal nanoparticle recycler device being located on the right side of the sealed working chamber, the exhaust being configured to exhaust air from the sealed working chamber while the metal nanoparticle recycler device being configured to recycle the excess metal nanoparticles.

Features can be implemented under specific process conditions as follow: the distance from the nanoparticle nozzle to the workpiece surface is 5 mm-8 mm; the granularity of the metal nanoparticles is 10 nm-50 nm and the metal nanoparticles are titanium carbide, silicon carbide and the like; the compressed gas is air, the barometric pressure of which is 0.5 MPa-3 MPa and the flow rate of which is 240 m/s-1000 m/s; the output pressure of the black paint is 480-500 kpa, and the nozzle diameter of the tapered holes is 2 mm and the taper angle thereof is 28°; the pulse width of the laser beam emitted by the high-power pulse laser device is 5 ms-100 ms (adjustable) and the energy thereof is 10 J-100 J (adjustable); and spot diameter of the spot regulator device is 0.5 mm-12 mm. The moving speed of the metal nanoparticles may reach 3340 m/s-6000 m/s under these parameters. The metal nanoparticles shock at this speed and are embedded into the metal material surface to form a nanostructured layer. Those metal nanoparticles not embedded into the metal material surface may be recycled by the metal nanoparticle recycler device.

The metal nanoparticles gain a quite high speed in the aid of the high velocity gas produced by the compressed air; black paint ejected from the tapered holes absorbs the laser energy by the effect of laser radiation to be quickly vaporized and ionized and instantaneously forms a large quantity of dense high temperature plasmas which continue to absorb the laser energy to heat up and swell up and then explode to form an intense shock wave, the intense shock wave in turn produces powerful thrust to move the metal nanoparticles downwards at an initial speed that is several times of sound velocity; with the continuous propagation of the shock wave in air, the shock wave accelerates the metal nanoparticles constantly, the metal nanoparticles move at an ever-increasingly faster speed so that the metal nanoparticles shock at a maximum speed and are embedded into the metal material surface to form a nanostructured layer. As the shock effect between the metal nanoparticles and the metal material surface results in server plastic deformation on the metal surface thus to form a large number of dislocation, twin-crystal and sub-crystal structures that lead to grain refinement, the metal material surface itself forms nanocrystalline. As the five-axis linkage workbench provides movement in three coordinates and rotation in two axes, a workpiece on the workbench may be moved and rotated, so that the workpiece may be kept at different positions and angles. As a result, surface nanocrystallization may be performed on parts with large curvature variation and complex shape.

Embodiments of the present invention has the following beneficial effects:

1. According to the method disclosed by the present invention, the metal nanoparticles are directly ejected into metal material surfaces to form a thick and excellent-performance nanostructured layer, thus the surface nanocrystallization effect is good. The metal nanoparticles not embedded into the metal material surface may be recycled by a metal nanoparticle recycler device.
2. The metal material surfaces, after being processed by the method disclosed by the present invention, have little deformation and low roughness.
3. According to the method disclosed by the present invention, surface nanocrystallization may be performed on parts with large curvature variation and complex shape (for example, gears and cylindrical spring parts).
4. The method disclosed by the present invention will not cause defects such as corrosion or crack on the metal material surfaces.
5. The method may achieve automation, and has high productivity and high surface nanocrystallization speed.

BRIEF DESCRIPTION

Figure 1:
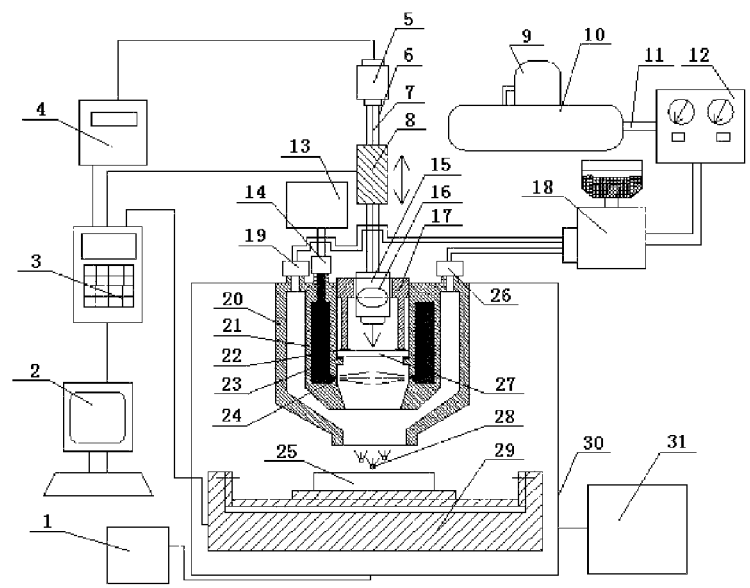
FIG. 1 is a schematic diagram of the apparatus for nanocrystallizing a metal surface by laser-induced shock wave-accelerated nanoparticles.
Figure 2:
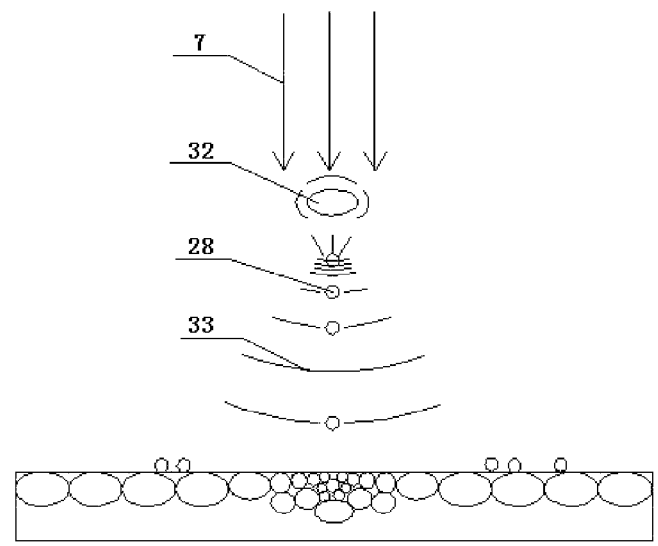
FIG. 2 is a schematic diagram showing the principle of nanocrystallizing a metal surface by laser-induced shock wave-accelerated nanoparticles.
Figure 3:
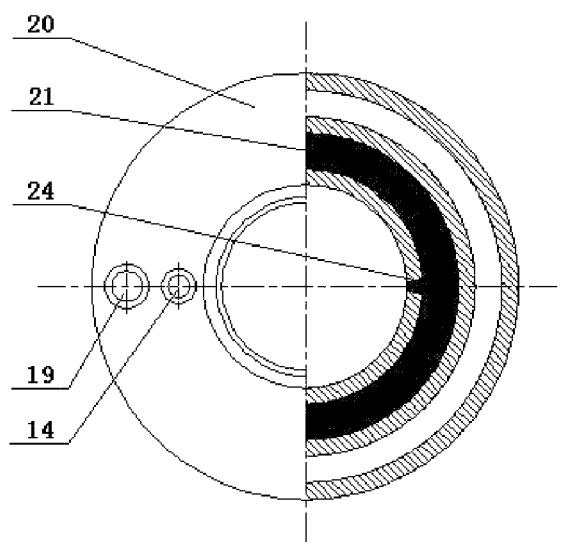
FIG. 3 is a half-sectional view of a nanoparticle nozzle.

In the drawings: 1—Exhaust; 2—Industrial controller; 3—Digital controller; 4—Laser controller; 5—High-power pulse laser device; 6—Light guiding pipe; 7—Laser beam; 8—Spot regulator device; 9—Air compressor; 10—Air tank; 11—Air guiding pipe; 12—Pressure controller; 13—Paint feeder device; 14—Black paint input port; 15—Pounding head; 16—Focusing lens; 17—Top cover; 18—Powder feeder device; 19—Nanoparticle input port; 20—Nanoparticle nozzle; 21—Black paint; 22—Spacer A; 23—Spacer B; 24—Tapered hole; 25—Workpiece; 26—Nanoparticle input port; 27—High pressure resistant K9 glass; 28—Metal nanoparticle; 29—Five-axis linkage workbench; 30—Sealed working chamber; 31—Metal nanoparticle recycler device; 32—Plasma; 33—Shock wave.

DETAILED DESCRIPTION

The method for nanocrystallizing a metal surface by laser-induced shock wave-accelerated nanoparticles comprises the following implementation steps:
  A. polishing a surface of a workpiece and then cleaning the surface with acetone and alcohol, fixing the workpiece onto a five-axis linkage workbench, and well adjusting the vertical distance from the five-axis linkage workbench to a nanoparticle nozzle;
  B. activating an air compressor and an exhaust, and regulating the pressure and flow rate of air through a pressure controller;
  C. controlling and regulating a paint feeder device so that the black paint is ejected from tapered holes as mist;
  D. regulating the parameters of a high-power pulse laser device (the parameters include laser energy and pulse width) and the parameters of a spot regulator device (spot diameter); in this step, the black paint absorbs the laser energy and explodes to form an intense shock wave that produces powerful thrust to constantly accelerate the metal nanoparticles so that the metal nanoparticles shock at the maximum speed and are embedded into the surface of the workpiece to form a nanostructured layer;
  E. recycling the excess metal nanoparticles by a metal nanoparticle recycler device; and
  F. rinsing the non-vaporized/ionized black paint on the surface of the workpiece.

Hereinafter, the present invention will be described in details with reference to FIG. 1, and the description is not intended to limit the present invention.

As shown in FIG. 1, an apparatus for nanocrystallizing a metal surface by laser-induced shock wave-accelerated nanoparticles comprises an exhaust 1, an industrial controller 2, a digital controller 3, a laser controller 4, a high-power pulse laser device 5, a spot regulator device 8, an air compressor 9, an air tank 10, an air guiding pipe 11, a pressure controller 12, a paint feeder device 13, a black paint input port 14, a pounding head 15, a top cover 17, a powder feeder device 18, a nanoparticle input port A 19, a nanoparticle nozzle 20, a spacer A 22, a spacer B 23, a workpiece 25, a nanoparticle input port B 26, high pressure resistant K9 glass 27, a five-axis linkage workbench 29, a sealed working chamber 30 and a metal nanoparticle recycler device 31.

A surface of the workpiece 25 is polished and then cleaned with acetone and alcohol, the workpiece 25 is fixed onto the five-axis linkage workbench 29, and the vertical distance from the five-axis linkage workbench 29 to the nanoparticle nozzle 20 is well adjusted. The air compressor 9 and the exhaust 1 are activated, flowing air produced by the air compressor 9 passes through the pressure air tank 10 and the pressure controller 12, and the flowing air accelerates and directs the metal nanoparticles 28 into the sealed working chamber 30. The pressure controller 12 regulates the pressure and flow rate of air so that the parameters meet the requirements of the tests. Meanwhile, the parameters of the high-power pulse laser device 5 (the parameters include laser energy and pulse width) and the parameters of the spot regulator 8 apparatus (spot diameter) are regulated, so that the parameters meets the requirements of the tests. The high-power pulse laser device 5 emits a laser beam 7 which penetrates through the high pressure resistant K9 glass and radiates onto black paint provided by the paint feeder device 13 and ejected from tapered holes 24. The black paint 21 absorbs the laser energy to be quickly vaporized and ionized and instantaneously forms a large quantity of dense high temperature plasmas 32 which continue to absorb the laser energy to heat up and swell up and then explode to form a powerful shock wave 33 which in turn produces powerful thrust to act on the metal nanoparticles 28, so that the metal nanoparticles 28 shock the surface of the workpiece 25 at an initial speed that is several times of sound velocity. With the continuous propagation of the shock wave 33 in air, the shock wave 33 accelerates the metal nanoparticles 28 constantly, the metal nanoparticles 28 move at an ever-increasingly faster speed so that the metal nanoparticles 28 shock the metal material surface at the maximum speed and are embedded into the surface of the workpiece 25 to form a nanostructured layer. Meanwhile, as the shock effect of the metal nanoparticles 28 results in server plastic deformation on the surface of the workpiece 25 thus to form a large number of dislocation, twin-crystal and sub-crystal structures that lead to grain refinement, the surface of the workpiece 25 itself forms nanocrystalline. The metal nanoparticle recycler device 31 recycles the excess metal nanoparticles 28.

Embodiment 1

The base material is supposed to be 45 steel. A surface of a workpiece is polished and then cleaned with acetone and alcohol, the workpiece is fixed onto a five-axis linkage workbench, and the vertical distance (6 mm) from the five-axis linkage workbench to a nanoparticle nozzle is well adjusted. An air compressor, an exhaust and a metal nanoparticle recycler device are activated, flowing air produced by the air compressor passes through a pressure controller and a powder feeder device, and the flowing air accelerates and directs the silicon carbide nanoparticles into a sealed working chamber. The pressure controller regulates the pressure (1.5 MPa) and flow rate (400 m/s) of air. A high-power pulse laser device and a spot regulator device are regulated, so that the laser energy is 90 J, the pulse width is 33 ms and the spot diameter is 4 mm. A laser beam penetrates through the high pressure resistant K9 glass and radiates onto black paint. Under the powerful thrust of the laser-induced shock wave, the silicon carbide nanoparticles are emitted into the surface of the workpiece to form a nanostructured layer.

After processed by this method, silicon carbide nanoparticles may be well combined into the surface of the 45 steel and are evenly distributed through X-ray diffraction and electron microscope analysis. The nanostructured layer has a thickness of 1-50 nm, the surface grain size is 8-50 nm, and the average grain size is 24 nm. The nanostructured layer on the surface of the steel is enough to guarantee the mechanical performances of the metal parts.

The invention claimed is:

1. An apparatus for nanocrystallizing a metal surface by shock wave-accelerated nanoparticles comprising:
a control system, a light guiding system, a workbench control system, and an auxiliary system;
wherein the control system comprises an industrial controller, a digital controller, a laser controller and a pressure controller, the digital controller being connected to the laser controller and the industrial controller, the laser controller being connected to a pulse laser device, the industrial controller controlling the laser controller, a spot regulator device and a five-axis linkage workbench via the digital controller, respectively, the laser controller controlling the pulse laser device, the pressure controller controlling pressure of air output from an air tank;
wherein the light guiding system comprises a light guiding pipe, a pounding head and the spot regulator device, the spot regulator device being located between the pulse laser device and the pounding head and connected to the digital controller, the pulse laser device being located above the spot regulator device while the pounding head is located below the spot regulator device, a focusing lens being located inside the pounding head, the pulse laser device being connected to the spot regulator device through the light guiding pipe, the spot regulator device being connected to the pounding head through the light guiding pipe;
wherein the workbench control system comprises the digital controller, a workpiece and the five-axis linkage workbench, the workpiece being located above the five-axis linkage workbench, the digital controller regulating the relative position of the workpiece and a nanoparticle nozzle by controlling the five-axis linkage workbench;
wherein the auxiliary system comprises an air compressor, a paint feeder device, the nanoparticle nozzle, a powder feeder device, an exhaust, a sealed working chamber and a metal nanoparticle recycler device, the nanoparticle nozzle being located in the upper part of the sealed working chamber, the nanoparticle nozzle being a hollow cylinder with a ring-shaped inner chamber and a ring-shaped outer chamber, a first spacer being located on a flange of an outer wall on the inside of the inner chamber, a piece of high pressure resistant K9 glass being located between the first spacer and a second spacer and fixed by a top cover, two tapered holes symmetrically distributed along an axis being disposed on the bottom of the inner chamber, a black paint input port in the upper left part of the inner chamber being connected to the paint feeder device, a first nanoparticle input port and a second nanoparticle input port located in the upper part of the outer chamber and symmetrically distributed along an axis being connected to the powder feeder device via an air guiding pipe, respectively, the powder feeder device being connected to the pressure controller via the air guiding pipe, the pressure controller being connected to the air tank via the air guiding pipe, the exhaust and the metal nanoparticle recycler device being respectively connected to the sealed working chamber, the exhaust being located at the left side of the sealed working chamber with the exhaust pipe of the exhaust located in the lower part of the five-axis linkage workbench, the metal nanoparticle recycler device being located on the right side of the sealed working chamber, the exhaust being configured to exhaust air from the sealed working chamber while the metal nanoparticle recycler device being configured to recycle the excess metal nanoparticles.

2. A method for nanocrystallizing a metal surface by shock wave-accelerated nanoparticles comprising:
polishing a surface of a workpiece, cleaning the surface with acetone and alcohol, fixing the workpiece onto a five-axis linkage workbench, and adjusting a vertical distance from the five-axis linkage workbench to a nanoparticle nozzle, wherein the nanoparticle nozzle is a hollow cylinder with a ring shaped inner chamber and a ring shaped outer chamber, a first spacer being located on a flange of an outer wall on the inside of the inner chamber, a piece of high pressure resistant K9 glass being located between the first spacer and a second spacer and fixed by a top cover, two tapered holes symmetrically distributed along an axis being disposed on the bottom of the inner chamber, a black paint input port in the upper left part of the inner chamber being connected to a paint feeder device, a first nanoparticle input port and a second nanoparticle input port located in the upper part of the outer chamber and symmetrically distributed along an axis;
activating an air compressor and an exhaust, and regulating a pressure and flow rate of air from the air compressor by a pressure controller;
providing metal nanoparticles from the first nanoparticle input port and the second nanoparticle input port;
accelerating the metal nanoparticles by the regulated air from the air compressor;
controlling and regulating the paint feeder device so that black paint is ejected from the two tapered holes as mist;
regulating parameters of a pulse laser device and a spot regulator device;
emitting laser energy from the pulse laser device;
absorbing the laser energy by the black paint, wherein the absorbed energy causes the black paint to explode to form an shock wave that produces thrust to constantly accelerate the metal nanoparticles so that the metal nanoparticles are embedded into the surface of the workpiece to form a nanostructured layer;
recycling the excess metal nanoparticles by a metal nanoparticle recycler device; and
rinsing the non-vaporized/ionized black paint off the surface of the workpiece.

3. The method for nanocrystallizing a metal surface by shock wave-accelerated nanoparticles according to claim 2, wherein a distance from the nanoparticle nozzle to the workpiece is 5 mm-8 mm.

4. The method for nanocrystallizing a metal surface by shock wave-accelerated nanoparticles according to claim 2, wherein a granularity of the metal nanoparticles is 10 nm-50 nm and the metal nanoparticles are at least one of titanium carbide and silicon carbide.

5. The method for nanocrystallizing a metal surface by shock wave-accelerated nanoparticles according to claim 2, wherein the air compressor regulates the pressure to a barometric pressure of 0.5 MPa-3 MPa and the flow rate to 240 m/s-1000 m/s.

6. The method for nanocrystallizing a metal surface by shock wave-accelerated nanoparticles according to claim 2, wherein a nozzle diameter of the tapered holes is 2 mm and the taper angle thereof is 28°; and the output pressure of the black paint is 480-500 kpa.

7. The method for nanocrystallizing a metal surface by shock wave-accelerated nanoparticles according to claim 2, wherein a pulse width of the laser beam emitted by the pulse laser device is 5 ms-100 ms, the energy thereof is 10 J-100 J, and spot diameter of the spot regulator device is 0.5 mm-12 mm.

* * * * *